(12) United States Patent
Fischer

(10) Patent No.: US 7,997,401 B2
(45) Date of Patent: Aug. 16, 2011

(54) APPARATUS FOR DISPLACING UNITS RELATIVE TO A TRANSPORT TRACK

(75) Inventor: Manfred Fischer, Freising (DE)

(73) Assignee: Krones AG (DE)

( * ) Notice: Subject to any disclaimer, the term of this patent is extended or adjusted under 35 U.S.C. 154(b) by 488 days.

(21) Appl. No.: 12/120,202

(22) Filed: May 13, 2008

(65) Prior Publication Data

US 2008/0289930 A1 Nov. 27, 2008

(30) Foreign Application Priority Data

May 14, 2007 (DE) .......................... 10 2007 022 910

(51) Int. Cl.
*B65G 47/24* (2006.01)
(52) U.S. Cl. ......... 198/411; 198/436; 198/440; 198/441
(58) Field of Classification Search .................. 198/411, 198/436, 438, 440, 441
See application file for complete search history.

(56) References Cited

U.S. PATENT DOCUMENTS

| | | | | |
|---|---|---|---|---|
| 4,511,027 A | * | 4/1985 | Zamboni .................... | 198/470.1 |
| 4,767,487 A | * | 8/1988 | Tomsovic, Jr. ................ | 156/256 |
| 5,231,926 A | * | 8/1993 | Williams et al. ................ | 101/40 |
| 5,381,884 A | * | 1/1995 | Spatafora et al. ............. | 198/433 |
| 5,921,375 A | * | 7/1999 | van Laar .................... | 198/471.1 |
| 6,283,694 B1 | * | 9/2001 | Spatafora et al. ........ | 414/416.05 |
| 6,467,609 B1 | * | 10/2002 | Williams et al. ........... | 198/471.1 |
| 6,491,153 B1 | * | 12/2002 | Cassoni et al. ................ | 198/441 |
| 6,631,673 B2 | * | 10/2003 | Aichele ............................ | 101/40 |
| 6,726,001 B2 | * | 4/2004 | Wild et al. .................... | 198/433 |
| 6,843,361 B2 | * | 1/2005 | Maingonnat et al. ......... | 198/456 |
| 7,347,312 B2 | * | 3/2008 | Han et al. ................... | 198/346.2 |

FOREIGN PATENT DOCUMENTS

| | | |
|---|---|---|
| CH | 653 644 | 12/1978 |
| DE | 44111 | 4/1966 |
| DE | 28 10 834 | 9/1979 |
| DE | 3844016 | 12/1988 |
| DE | 41 00 945 | 1/1991 |
| DE | 102 19 129 | 4/2002 |
| DE | 102 61 551 | 7/2004 |
| DE | 103 01 178 | 8/2004 |
| DE | 601 05 549 | 9/2005 |
| EP | 0 842 853 | 5/1998 |
| EP | 1 216 939 | 6/2002 |
| EP | 1 293 453 | 3/2003 |
| EP | 1 767 474 | 3/2007 |
| WO | WO 2004/089790 | 10/2004 |
| WO | WO 2006/089702 | 8/2006 |

* cited by examiner

*Primary Examiner* — Douglas A Hess
(74) *Attorney, Agent, or Firm* — Hayes Soloway P.C.

(57) ABSTRACT

The invention relates to an apparatus (1) for displacing objects (2) relative to a transport track (10) along which the objects (2) are moved, comprising a plurality of displacement devices (4) which displace at least some of the objects (2) relative to this transport track (10), wherein the displacement devices (4) have at least one displacement element (6) which in at least one region can be brought into contact with the objects (2) in order to displace the latter relative to the transport track (10). According to the invention, the displacement elements (6) can pivot about a predefined pivot axis (S) and movement devices (8) which are respectively assigned to the displacement elements (6) are provided such that various displacement elements (6) can be displaced in their entirety relative to the transport track (10) onto different transport paths.

17 Claims, 2 Drawing Sheets

APPARATUS FOR DISPLACING UNITS RELATIVE TO A TRANSPORT TRACK

The present invention relates to an apparatus for displacing objects relative to a transport track. The invention will be described with reference to units, such as crates of bottles or groups of bottles wrapped in shrink-fit film, which are conveyed on a transport track or transport belt. In the packaging industry, it is customary to stack a number of layers, for example of beverage crates, six-packs and the like, one above the other. In this case, some of the units are rotated or displaced relative to one another in the different layers, in order in this way to achieve a greater stability of the stack as a whole. In order to achieve these rotations or displacements of the individual units, apparatuses are required which bring about a rotation and displacement of the units relative to the transport track.

Various apparatuses for displacing containers are known from the prior art.

DE 38 44 016 A1 describes an apparatus for rotating rectangular containers. In this case, displacement devices are provided which move along a permanently defined track. At the same time, these displacement devices are pivotable and can in this way grip packages and rotate these through defined angles. However, the rotation here is directly coupled to the movement of the displacement element. In addition, the packages are moved by the displacement device only along a set transport track, and this apparatus is therefore not suitable for the described application, that is to say for the purpose of achieving different layers with different geometric arrangements of the units in the individual layers of units. Furthermore, in the case of DE 38 44 016 A1, the individual packages are transferred into two different transport tracks depending on their original position, which is likewise not acceptable for the use which forms the present subject matter.

DE 102 19 129 A1 discloses a method and an apparatus for rotating and distributing or piecing together packs. In this case, the relevant packs are supplied in at least one feed track and are conveyed away in at least one parallel discharge track and are in some cases rotated through 90°. In order to bring about this rotation, a gripper device is provided which grips the packs at two opposite end sides and then rotates. However, this apparatus is relatively inflexible in terms of handling since the gripper devices in each case have to be withdrawn after the packs have been rotated. For this purpose, a drive motor is provided which raises the corresponding gripper head.

DE 102 61 551 A1 discloses a rotary device for rotating objects on a conveyor. In this case, this rotary device is arranged such that it can pivot about a pivot axis, but this pivot axis is itself stationary. This apparatus therefore allows only precisely defined rotations of the objects but not displacements of said objects, independently of this rotation, on the transport track in addition to the rotation.

WO 2006/089702 A1 likewise describes a rotary device. In this case, a rotating head is provided which can be lowered from above onto the object located on a support surface, with the object being entrained as the rotating head rotates. Here, the rotating head is likewise arranged in a stationary manner and can be moved only in a direction perpendicular to the support surface.

CH 653 644 A5 discloses an apparatus for splitting items arriving in a single row into two parallel directions. In this apparatus, however, no rotation of the items is possible.

The object of the present invention is therefore to provide an apparatus for displacing objects, which on the one hand allows a rotation of these objects relative to a transport track and on the other hand, if desired, also allows a displacement of these objects so that in this way the individual objects, which in the present case are beverage crates, can be stacked one above the other in a number of layers in different orientations. According to the invention, this is achieved by an apparatus according to claim 1, an installation according to claim 12 and a method according to claim 14. Advantageous embodiments and further developments form the subject matter of the dependent claims.

The apparatus according to the invention for displacing objects relative to a transport track along which the objects are moved comprises a plurality of displacement devices which displace at least some of the objects relative to this transport track. At least some of the displacement devices have a displacement element which in at least one region can be brought into or is in contact with the objects in order to displace the latter relative to the transport track. According to the invention, the displacement elements can pivot about predefined pivot axes. Furthermore, movement devices which are respectively assigned to the displacement elements are provided such that various objects can be displaced in their entirety relative to the transport track onto different transport paths.

The transport track is understood to mean a surface which is usually defined by a transport belt. This transport track may be planar, but it would also be possible for curved transport tracks to be used. Preferably, the transport track has a flat, curved plane.

The objects are in particular units or beverage crates. The transport path is understood to mean the course along which the objects are guided. It is possible for this transport path to be curved in some sections.

A displacement relative to the transport track is in principle understood to mean any movement relative to the transport track, i.e. including a rotation of the objects, which possibly at the same time results in a displacement thereof.

The displacement element is preferably a plate or a surface which bears against the object to be displaced. However, it would also be possible for a bracket, a rod or the like to be provided as the displacement element, which allows a displacement of the objects.

According to the invention, the displacement device is not only pivoted about a pivot axis but is also moved in its entirety relative to the transport track. In this way, the unit can in principle be displaced into any desired rotational position and also into any desired position within the transport track. Usually, however, a rotation through 90° takes place. A displacement of the unit in its entirety is understood to mean that in particular also the pivot axis of the displacement elements can be displaced relative to the transport track.

At least partially different transport paths is understood to mean that various objects are not only pivoted about their pivot axis but rather are also guided on at least partially different paths and thus in particular attain different end positions at the end of the transport track. Preferably, a plurality of different end positions can be attained. For example, the objects may be arranged and guided in three different rows which run parallel to one another on the transport track or on a transport belt arranged downstream of this transport track. The apparatus according to the invention thus makes it possible to piece together the individual units, which can be varied in different layers to be stacked one above the other. In particular, a certain rotational position of the objects is possible independently of the displacement of the object in its entirety.

In contrast to this, partially pneumatically controlled run-in brackets are used in the prior art. This solution is admittedly favourable with regard to cost, but the rotation result is not precise.

Preferably, the displacement element is an angled element. The brackets or grippers known from the prior art, which grip the unit from two opposite sides and thus apply a force for rotation purposes, are thus simplified. An angled element can, when moved in a suitable manner relative to the transport track, achieve a precisely defined rotational position of the unit relative to the angled element.

Preferably, the displacement element is open in two directions which are perpendicular to one another. It is therefore an angled piece with two legs and two open sides opposite these legs. In this way, there is no need to withdraw the angled element as in the prior art, but rather it is possible, simply by braking the angled element, to detach the angled element from the object to be displaced. Also, there are preferably no hooking elements which hook into the relevant beverage crates in order to stabilise the latter. Such hooking elements bring the disadvantage that often very specific movements are required in order to detach the hooking elements again from the units or beverage crates.

The force required for a rotation or displacement of the object is thus generated by the displacement device placing the unit in the way, which unit has been transported for example by a belt. The displacement element thus bears in a form-fitting manner and the force-fit is produced via friction forces of the object slipping through. Due to the relative speed and the friction, a force vector is produced. The engagement of the plate or angled element preferably takes place in such a way that the force vector points into the surface of the plate or in a direction located between the normals on the two legs of the angled element. This is provided in particular in the case of an angled plate, since fluctuations of the force vector angle can thus also be intercepted, provided that the vector meets the lateral guide surfaces at right angles or less. This will be explained in greater detail with reference to the figures. By a targeted movement of the displacement device or of the displacement elements, it is therefore possible to achieve an exact rotation or displacement, even in combination.

Preferably, the pivoting movement of the displacement element about the predefined pivot axis and the movement of the displacement element in the predefined displacement direction can be carried out independently of one another. A variety of movements of the object relative to the transport track are therefore possible, for example a simple displacement of the object, a displacement and a rotation of the object, or a pure rotation of the object. In this way, different layers which are to be stacked one above the other can be pieced together as desired, for example in a computer-controlled manner. Preferably, the individual displacement devices can be controlled independently of one another.

Advantageously, the angled element has a first leg and a second leg which intersect along a predefined line and the pivot axis is at a distance from this predefined line and is arranged between the two legs. This arrangement of the pivot axis means that, when the angled element rotates, the object is not pushed out of the angled element by the centrifugal forces. Preferably, the pivot axis is arranged such that the centre of gravity of the objects to be displaced is located between the predefined line and the pivot axis. Furthermore, with particular preference, the pivot axis is located in the region of the bisector of the angle formed between the two legs. In this way, in the event of pivoting of the angled element, the object is pushed more or less in the direction of the two legs, which is particularly advantageous also with regard to the high operating speeds of such apparatuses. In a further advantageous embodiment, the two legs are substantially perpendicular to one another, and with particular preference a region of each leg bears at least temporarily against the object to be displaced. This arrangement is particularly suitable for objects with a rectangular cross section.

Preferably, the pivot axis and the predefined line along which the legs intersect are substantially parallel to one another. Furthermore, with particular preference, the pivot axis is substantially perpendicular to the transport track and/or perpendicular to the plane spanned by the different transport paths.

In a further advantageous embodiment, the movement devices are in each case designed as cantilevers or cantilever arms. In this case, the displacement elements can advantageously move in the longitudinal directions of the respective cantilevers. In a further advantageous embodiment, the movement devices can move about a central rotation axis. In this embodiment, it is in particular possible for a plurality of cantilevers to be arranged such that they can rotate about the rotation axis and for the displacement elements to be provided in turn at the ends of these cantilevers. However, it would also be possible for a plurality of cantilevers to be arranged on a chain or the like, wherein this chain is in turn guided on an elliptical or arc-shaped track.

The present invention also relates to an installation for conveying objects. This installation comprises a transport belt which conveys objects arranged on the transport belt. Also provided is a plurality of displacement devices which displace at least some of the objects relative to a transport track, wherein the displacement devices in each case have at least one displacement element which in at least one region can be brought into contact with the objects in order to displace the latter relative to the transport track. According to the invention, the displacement elements can pivot about a predefined pivot axis and movement devices which are respectively assigned to the displacement elements are provided such that various displacement elements can be displaced in their entirety relative to the transport track onto different transport paths.

Preferably, the displacement elements, at least intermittently, move more quickly in the transport direction than the transport belt. As a result, the object to be displaced, at least during this movement section, is pressed against the displacement device or into the angled element and in this way a clearly defined displacement movement is possible. The apparatus for carrying out the displacement itself is advantageously designed in the manner described above.

The present invention also relates to a method for displacing objects relative to a transport track along which the objects are moved, wherein the objects are displaced relative to this transport track by a plurality of displacement devices. According to the invention, at least some of the objects are pivoted about a predefined pivot axis which is substantially perpendicular to the transport track and various objects, in addition to this pivoting movement, are displaced in their entirety relative to the transport track onto different transport paths relative to the transport track.

Preferably, a predefined portion of the objects are pivoted about the predefined pivot axis. Also by means of this method according to the invention, a precise displacement of the objects relative to the transport track is possible. Preferably, a plurality of objects are displaced into precisely defined positions, in particular by means of a control device, and are stacked one above the other with other objects which have likewise been at least partially displaced.

Further advantages and embodiments will emerge from the appended drawings, in which.

Figure 1:
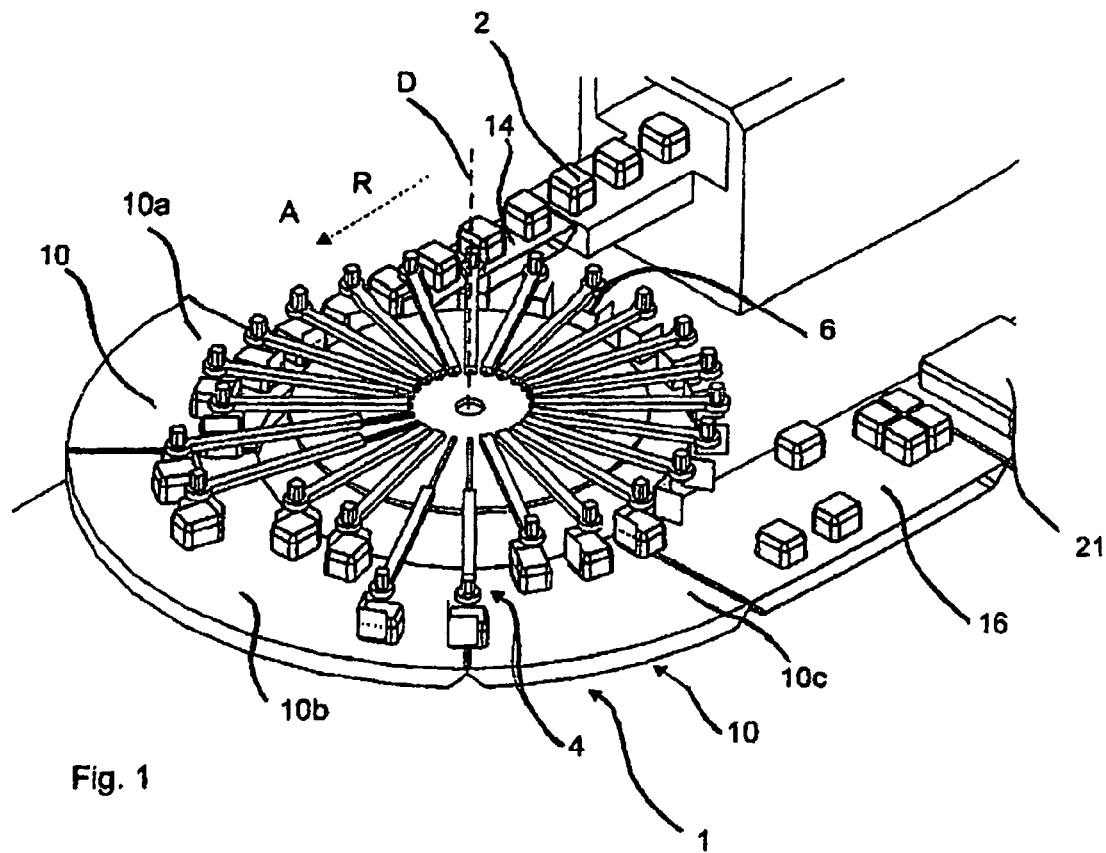
FIG. 1 shows a first view of an apparatus according to the invention for displacing objects.

FIG. 1 shows an installation with an apparatus for displacing objects 2. This installation comprises a transport belt 14 which conveys a plurality of objects 2 along a transport direction R. Reference 1 relates, as shown, to the apparatus according to the invention for displacing the objects 2 relative to a transport track 10. The transport track 10 is formed here at least in some sections as an annular-segment-shaped surface, along which the individual objects or the units 2 can be moved. The apparatus 1 has a rotation axis D, about which a plurality of displacement devices are rotatably arranged, said displacement devices being denoted in their entirety by reference 4. However, instead of the embodiment shown here, a chain arranged around two deflection rollers could also be provided, around which the individual displacement devices 4 revolve.

Here, the apparatus 1 is therefore designed as a circular rotating and distributing star wheel. The objects or units are deflected through 180° here, wherein the track for the units is designed as a driven 180° track for the units. As the method continues (not shown), different stacks of units are arranged one above the other, wherein a double column with two shutter-type heads can be used.

The displacement devices 4 in each case have displacement elements 6, which are designed here as angled elements. During operation in the installation, the individual angled elements bear against the respective objects 2 and thus guide the latter. For this purpose, at least in section A, the individual angled elements move more quickly in the direction R than the transport belt 14.

The transport track 10 is divided here into 3 segments 10a, 10b and 10c. It is thus also possible, within these individual segments 10a, 10b and 10c, to guide objects at different speeds. It would also be possible to configure for example the segments 10a and 10c as driven segments and to configure the middle segment 10b as a non-driven segment, for example in the form of a flat panel or in the form of a plurality of rollers.

Figure 2:
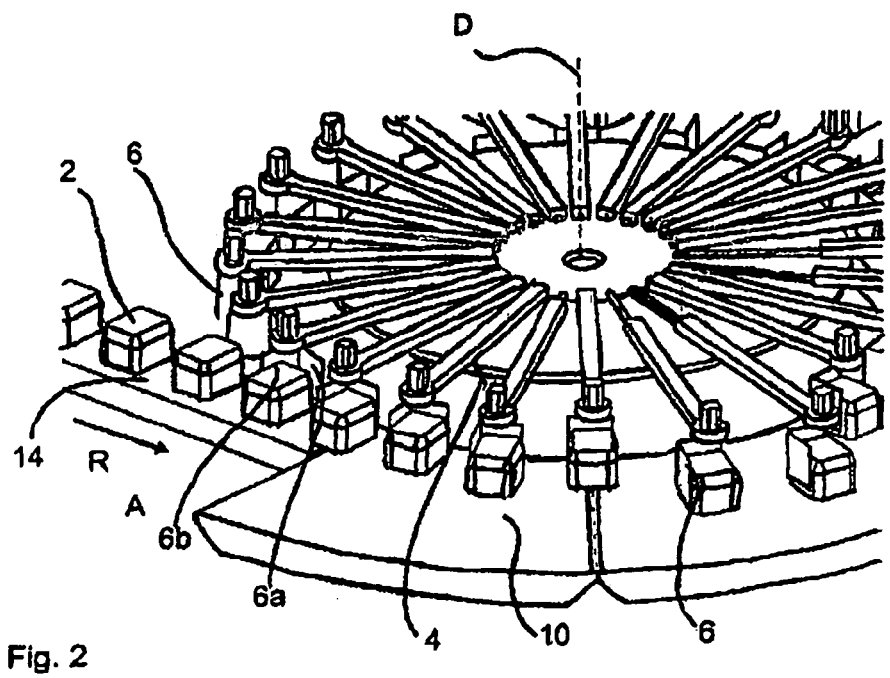
FIG. 2 shows a further view of an apparatus according to the invention for conveying objects.

FIG. 2 shows a detailed view in the region where the individual objects 2 are taken up. The objects 2 are supplied via the transport belt 14 for example from a shrink-fit film tunnel of a packaging machine and are picked up by the individual angled elements 6. During take-up, preferably one leg 6a of the angled elements is perpendicular to the radial direction relative to the rotation point D and the second leg 6b runs in the radial direction. Furthermore, at the time of take-up, the first leg 6a is arranged between the object 2 and the rotation point for each installation, and the second leg 6b displaces the object from behind. By virtue of this arrangement, the angled element can engage particularly easily in the intermediate spaces between two objects 2 which are guided forwards by the transport belt 14.

Figure 3:
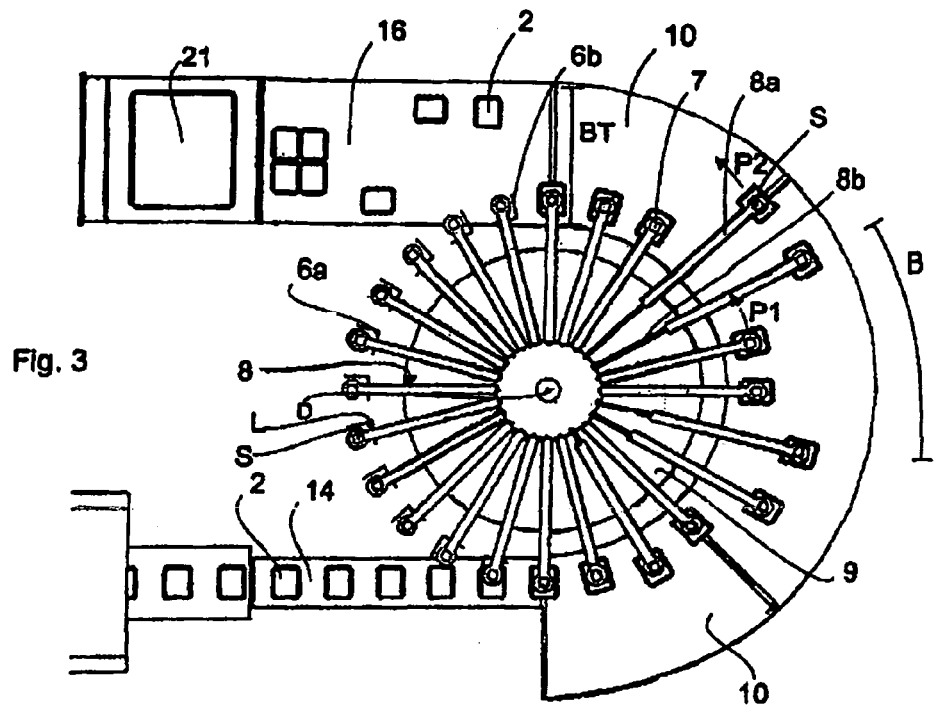
FIG. 3 shows a further view of an apparatus according to the invention for displacing objects.

FIG. 3 shows a further view, from above, of the apparatus according to the invention. As the method continues, the respective objects 2 can be rotated and at the same time can be moved outwards relative to the transport track 10, here in the radial direction via the rotation point D. Since there is simultaneously also a rotational movement of the displacement elements 6, it is not a pure movement radially outwards that is obtained, but rather an outwardly running spiral course. References P1 and P2 in FIG. 3 relate to different transport paths along which the objects 2 are conveyed. This conveying on different transport paths is possible due to the independent rotational movement and displacement movement of the movement devices 8. The objects 2 thus run in each case in the same region into the transport track 10, but leave the latter at different positions along the width BT of the transport belt, where they can be discharged in different rotational positions.

As shown in FIG. 3, the individual units are rotated through 90° for example within the illustrated section B. However, it is also possible to carry out the rotation in a shorter or longer section. Given a suitable movement of the individual displacement elements 6, therefore, the unit can in each case bear in a form-fitting manner against the angled element. As mentioned, due to the relative speed of the objects 2 and the friction relative to the transport track, a force vector is produced. The angled element 6 is in this case arranged in such a way that this force vector points into the angle 6, which means that the objects 2 are in each case pushed into the angled elements 6.

It can be seen that the pivot axis S runs parallel to the connecting line 2 between the respective legs 6a and 6b and lies in the interior of the area spanned by the two legs 6a and 6b. Reference 8b denotes rails which are arranged on the rotating disc 9 and which serve to guide the cantilever arms 8a. The displacement may in this case take place via program-controlled electric motor drives, e.g. gear drives or the like.

Figure 4:
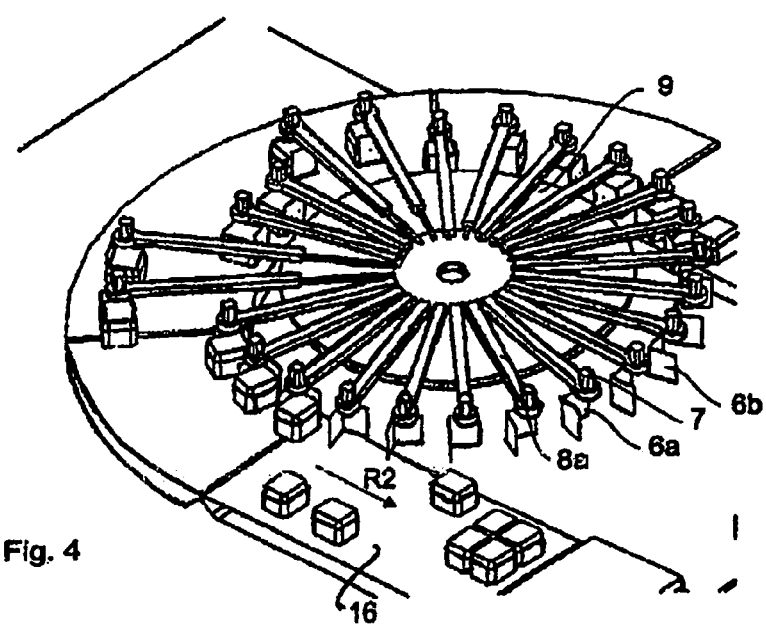
FIG. 4 shows a further view of an apparatus according to the invention for displacing objects.

FIG. 4 shows a further view of the apparatus according to the invention.

After travelling along the semi-circular transport track 3, the units are passed to a further transport belt 16. Here, as shown in FIG. 1, the individual objects 2 can be arranged in different rows relative to the transport track and also their rotational position can be varied, in each case by 90°. In this way, the individual objects can run into a container 21 and in the process are preferably arranged in such a way that the area of this container 21 is largely filled to capacity.

By means of a control device (not shown), in each case the rotational positions and the displacements of the individual containers can be pre-calculated in order to piece them together in the most suitable way. After bottoms have been supplied, the individual resulting packages can be arranged one above the other in stacks, which takes place by means of a stacking device (not shown). The transport belt 16 preferably moves in the direction R1 more quickly than the individual displacement elements, so that the objects can be removed from the latter.

As mentioned, the individual angled elements 6 can in each case pivot about predefined pivot axes S. In order to achieve the rotation, each displacement device 4 has a respective motor 7. These individual motors 7 can be controlled independently of one another.

Furthermore, the individual displacement devices have movement devices 8 which here include a cantilever arm 8a which can be displaced relative to a rail 8b and thus allows the movement in the radial direction relative to the rotation point D.

Through the combination of the pivoting movement and the radial movement relative to the rotation point, the objects can, as mentioned, assume substantially desired positions relative to the transport belt 16. In this case, however, the objects are usually either not pivoted or pivoted through precisely 90°. Nevertheless, other pivoting movements are conceivable, particularly in the case of objects with a non-rectangular cross section.

Figure 5:
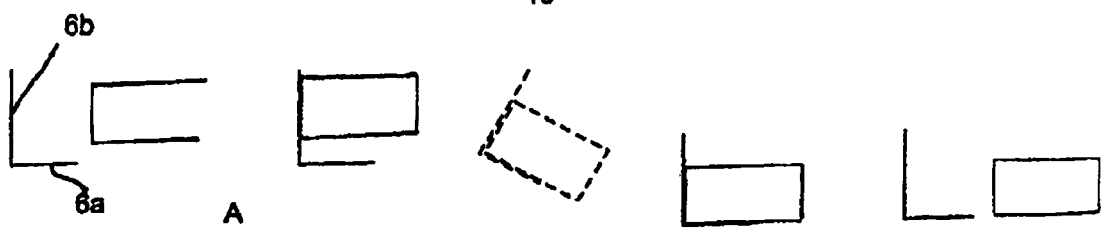
FIG. 5 shows a schematic diagram of the method for displacing objects.

FIG. 5 shows the take-up and discharge of an object 2 by an angled element, wherein here the object 2 is only displaced but is not rotated. Firstly, the angled element 6 with its two legs 6a and 6b is advanced towards the object 2 so that the leg 6b bears against a transverse side of the object. The angled element is then rotated about its pivot axis, which means that the object comes into an exact position relative to the angled element, i.e. into the position in which it bears with a longitudinal side and a transverse side against the two legs 6a and 6b of the angled element. In this position, the angled element is displaced together with the object and then is rotated back again so that the overall result is that the object is not rotated but rather is just displaced. In the last step, the object is conveyed away from the angled element at a higher speed than the latter and is thus arranged in a precisely defined position. It is thus possible, by a targeted movement of the displacement element 6, to achieve an exact rotation or displacement of the individual objects.

Here, as stated above, the shape of the circulation track or transport track is not restricted to a circular track, but rather transport along a straight line, a curved line or the like would also be conceivable. As mentioned above, the entire apparatus could also be constructed in the shape of an elongate O or oval. In any case, units continuously arriving at high speed can be distributed and optionally rotated without delay within a narrow space.

All the features disclosed in the application documents are claimed as essential to the invention in so far as they are novel individually or in combination with respect to the prior art.

The invention claimed is:

1. An apparatus for displacing objects relative to a transport track along which the objects are moved, comprising a plurality of displacement devices which displace at least some of the objects relative to the transport track, wherein the displacement devices have at least one displacement element which in at least one region can be brought into contact with the objects in order to displace the objects on the surface of the transport track, andwherein the displacement elements are pivotable about predefined pivot axes, and the displacement element has a first leg and a second leg which intersect along a predefined line and the pivot axis is at a distance from the predefined line and is arranged between the two legs and wherein movement devices which are respectively assigned to the displacement elements are provided such that various objects can be displaced in their entirety relative to the transport track onto different transport paths relative to the transport track.

2. The apparatus according to claim 1, wherein the displacement element is an angled element.

3. The apparatus according to claim 2, wherein the pivoting movement of the displacement element about the predefined pivot axis and the movement of the displacement element in its entirety can be carried out independently of one another.

4. The apparatus according to claim 1, wherein the displacement element is open in two directions which are perpendicular to one another.

5. The apparatus according to claim 1, wherein the first and second legs are substantially perpendicular to one another.

6. The apparatus according to claim 1, wherein the pivot axis and the predefined line are substantially parallel to one another.

7. The apparatus according to claim 1, wherein the movement devices are cantilevers.

8. The apparatus according to claim 7, wherein the displacement elements are moveable in the longitudinal directions of the cantilevers.

9. The apparatus according to claim 1, wherein the movement devices are rotatable about a central rotation axis.

10. The apparatus according to claim 1, wherein the pivoting movement of the displacement element about the predefined pivot axis and the movement of the displacement element in its entirety can be carried out independently of one another.

11. The apparatus according to claim 1, wherein the pivoting movement of the displacement element about the predefined pivot axis and the movement of the displacement element in its entirety can be carried out independently of one another via program-controlled electric motor drives.

12. An installation for conveying objects, comprising a transport belt which conveys objects arranged on the transport belt, comprising a plurality of displacement devices which displace at least some of the objects relative to a transport track, wherein the displacement devices have at least one displacement element which in at least one region can be brought into contact with the objects in order to displace the objects on the surface of the transport track, and wherein the displacement elements are pivotable about a predefined pivot axis, and the displacement element has a first leg and a second leg which intersect along a predefined line and the pivot axis is at a distance from the predefined line and is arranged between the two legs and wherein movement devices which are respectively assigned to the displacement elements are provided such that various displacement elements can be displaced in their entirety relative to the transport track onto different transport paths.

13. The installation according to claim 12, wherein the displacement elements, at least intermittently, move more quickly in the transport direction than the transport belt.

14. The installation according to claim 12, wherein the pivoting movement of the displacement element about the predefined pivot axis and the movement of the displacement element in its entirety can be carried out independently of one another.

15. The installation according to claim 12, wherein the pivoting movement of the displacement element about the predefined pivot axis and the movement of the displacement element in its entirety can be carried out independently of one another via program-controlled electric motor drives.

16. A method for displacing objects relative to a transport track along which the objects are moved, wherein the objects are displaced on the surface of the transport track by a plurality of displacement devices, wherein at least some of the objects are pivotable about a predefined pivot axis which is substantially perpendicular to the transport track and various objects, in addition to this pivoting movement, are displaceable in their entirety relative to the transport track onto different transport paths relative to the transport track, and wherein the pivoting movement of the displacement element about the predefined pivot axis and the movement of the displacement element in its entirety can be carried out independently of one another via program-controlled electric motor drives.

17. The method according to claim 16, wherein the pivoting movement of the displacement element about the predefined pivot axis and the movement of the displacement element in its entirety can be carried out independently of one other.

* * * * *

UNITED STATES PATENT AND TRADEMARK OFFICE
CERTIFICATE OF CORRECTION

| | | |
|---|---|---|
| PATENT NO. | : 7,997,401 B2 | Page 1 of 1 |
| APPLICATION NO. | : 12/120202 | |
| DATED | : August 16, 2011 | |
| INVENTOR(S) | : Fischer | |

It is certified that error appears in the above-identified patent and that said Letters Patent is hereby corrected as shown below:

Title Page, Item (56)

Add Reference 5,967,292  10/1999  Corrales

Claim 1, Col. 7, line 41 "track, andwherein the" should be --track, and wherein the--.

Signed and Sealed this
Thirtieth Day of October, 2012

David J. Kappos
*Director of the United States Patent and Trademark Office*